(12) United States Patent
Ritter (10) Patent No.: US 9,775,432 B2
(45) Date of Patent: Oct. 3, 2017

(54) COLLAPSIBLE CART AND METHOD OF ASSEMBLING

(71) Applicant: Phillip Ritter, Burlington, KY (US)

(72) Inventor: Phillip Ritter, Burlington, KY (US)

( * ) Notice: Subject to any disclaimer, the term of this patent is extended or adjusted under 35 U.S.C. 154(b) by 0 days.

(21) Appl. No.: 15/295,320

(22) Filed: Oct. 17, 2016

(65) Prior Publication Data

US 2017/0105520 A1    Apr. 20, 2017

Related U.S. Application Data

(60) Provisional application No. 62/242,948, filed on Oct. 16, 2015.

(51) Int. Cl.
*B65D 19/12* (2006.01)
*B62B 3/02* (2006.01)
*B62B 7/10* (2006.01)
*A47B 31/04* (2006.01)
*B62B 3/00* (2006.01)
*B62B 5/04* (2006.01)
*A47B 31/00* (2006.01)

(52) U.S. Cl.
CPC .............. *A47B 31/04* (2013.01); *B62B 3/005* (2013.01); *B62B 3/022* (2013.01); *B62B 5/0433* (2013.01); *A47B 2031/002* (2013.01); *A47B 2031/004* (2013.01); *B62B 2301/04* (2013.01)

(58) Field of Classification Search
CPC . B65D 7/28; B65D 9/18; B65D 19/12; B65D 2519/00711; B65D 2519/00781; B65D 2519/009; B62B 3/02; B62B 3/022; B62B 3/025; B62B 7/10; B62B 2205/04
See application file for complete search history.

(56) References Cited

U.S. PATENT DOCUMENTS

| | | | | |
|---|---|---|---|---|
| 3,162,888 A | * | 12/1964 | Mobus | A61G 7/00 16/35 D |
| 5,199,729 A | * | 4/1993 | Sievert | B62B 5/0013 108/15 |
| 8,152,014 B2 | * | 4/2012 | Elstone, Sr. | B65D 19/12 220/4.28 |

* cited by examiner

*Primary Examiner* — Bryan Evans
(74) *Attorney, Agent, or Firm* — Steve Witters; Witters & Associates (57) ABSTRACT

Technologies are described for a collapsible cart and method of assembly. The cart has a cart base and a removable cart table top. The cart base has a rectangular cart frame and a foldable leg extending from a first side, proximate each corner, of the rectangular cart frame. Each foldable leg is configured to rotate about a first end and to lock into an extended orientation, and to rotate into a folded orientation and become proximate the rectangular cart frame. A clasp assembly is proximate a second end of each of the foldable legs and are configured to clasp arms proximate each corner of the removable cart table top.

12 Claims, 7 Drawing Sheets

FIG. 7

COLLAPSIBLE CART AND METHOD OF ASSEMBLING

CROSS REFERENCE TO RELATED APPLICATIONS

This U.S. patent claims priority under 35 U.S.C. 119(e) to U.S. Provisional Patent Application No. 62/242,948, filed Oct. 16, 2015 entitled "COLLAPSIBLE CART" by Phillip Ritter, which is incorporated by reference in its entirety for all purposes.

FIELD OF THE DISCLOSURE

The invention relates to a collapsible cart and a method of assembling.

BACKGROUND

There are many methods and apparatus for displaying and transporting items. For example, carts may be used for presenting items for sale or for serving. For example, cafeterias display for sale a variety of food and/or drink items. Consumers may walk past the cart and choose from the displayed items for purchase. A cart presenting items for sale may be transported to customers for selection and sale, for example a cart may be may be transported to a table at a restaurant or to a booth at a trade show for example.

It is often desired to have the cart be moveable or transportable. For example, it may be desirous to disassemble or make a cart more compact for moving in a vehicle. It may be desired to provide a collapsible cart that may provide efficiency in assembling for use in presenting items and efficiency in collapsing for compact storage or transportation of the cart.

SUMMARY

In one aspect of the present disclosure, a collapsible cart comprises a cart base and a removable cart table top. The cart base comprises a rectangular cart frame with a foldable leg extending from a first side, proximate each corner, of the rectangular cart frame. Each foldable leg is configured to rotate about a first end and to lock into an extended orientation, and to rotate into a folded orientation and become proximate the rectangular cart frame. A clasp assembly is proximate a second end of each of the foldable legs. A wheel rotatably extends from a second side, proximate each corner, of the rectangular cart frame. The removable cart table top comprises a flat surface on a first side of the removable cart table top and an arm proximate each corner of a second side of the removable cart table top. Each arm is configured and disposed to cooperate with one of the clasp assemblies and removably hold the table top to the cart base.

In another aspect of the present disclosure, a method for assembling a collapsible cart comprises placing a cart base on a horizontal surface and unfolding legs about a first end on the cart base, from a folded orientation and into an extended orientation. The legs are locked into the extended orientation. A table top is set onto second ends of the locked legs and is clasped onto the second ends of the locked legs.

BRIEF DESCRIPTIONS OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
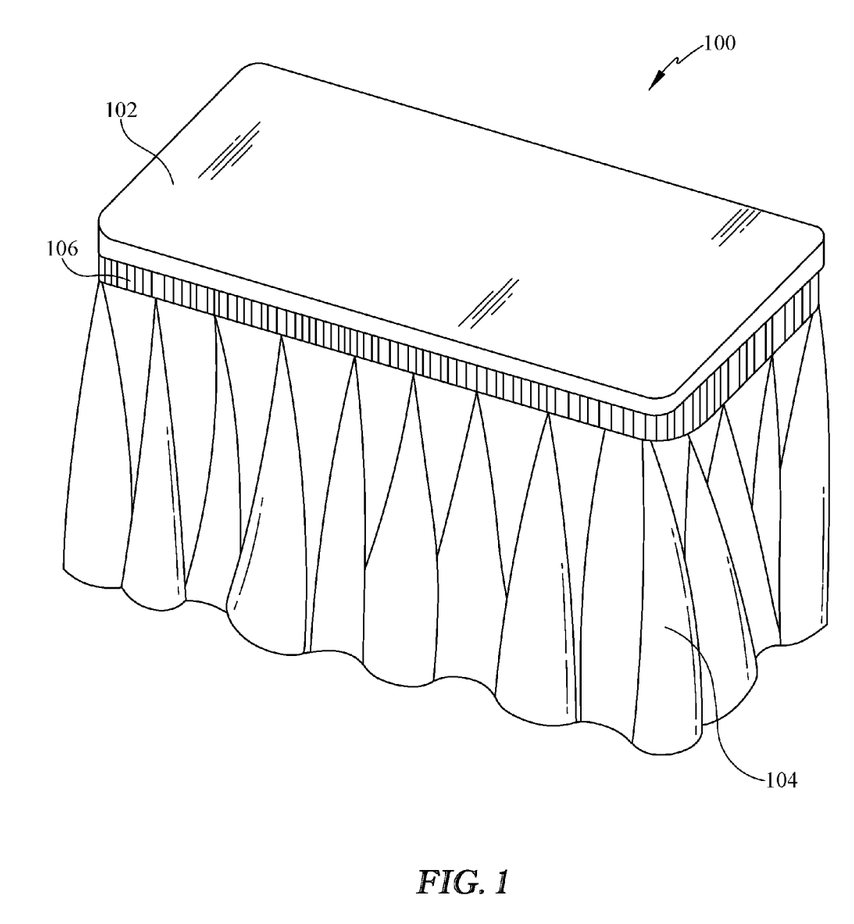
FIG. 1 shows a collapsible cart of the present disclosure.

FIG. 1 shows collapsible cart 100 of the present disclosure. Collapsible cart 100 may have a removable table top 102 and a cart base supporting removable table top 102. A curtain 104 may substantially surround the cart base. An upper portion, 106, of curtain 104 may be removably held to the cart base or removable table top 102. For example, upper portion 106 may have loops or hooks and removable table top 102 or the cart base may have the other of the loops or hooks to provide a loop and hook fastener. In at least one embodiment of the present disclosure, the cart base has side rails configured for attaching curtain 104 thereto.

Figure 2:
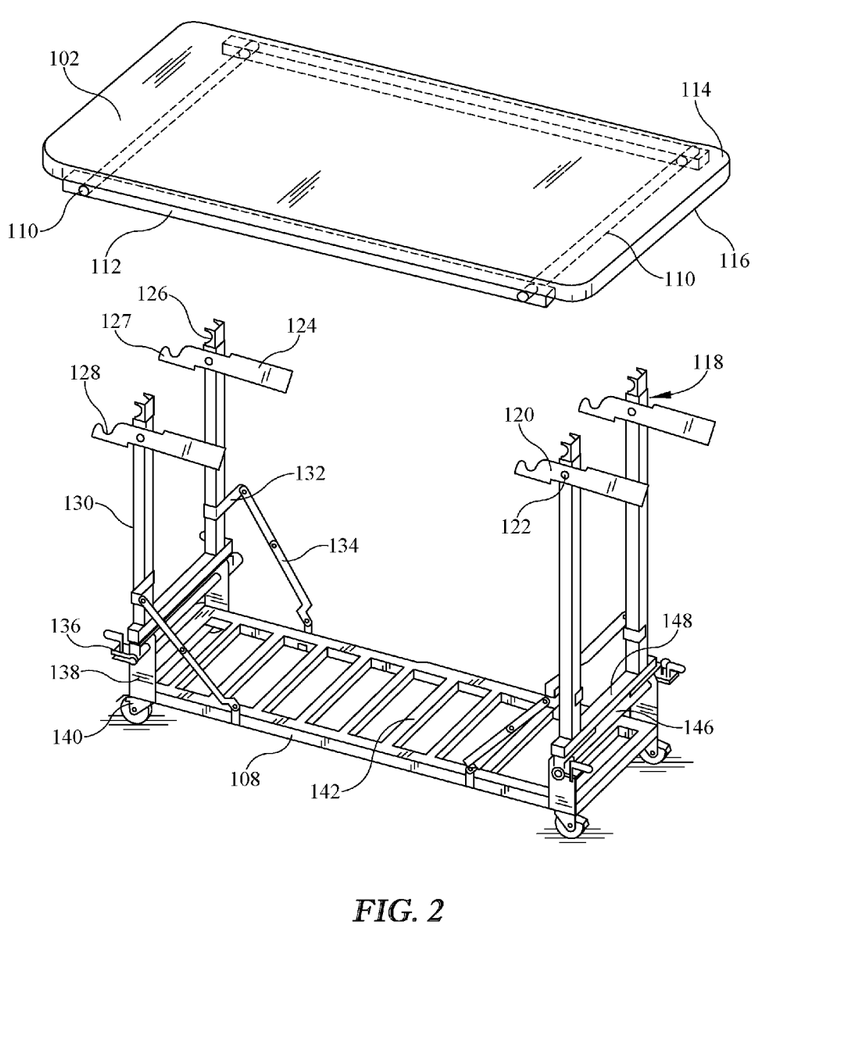
FIG. 2 shows a cart base and a cart table top removed from the cart base, of the collapsible cart shown in FIG. 1.

FIG. 2 shows a cart base and a cart table top 102 removed from the cart base, of collapsible cart 100. Collapsible cart 100 comprises a cart base and a removable cart table top 102. The cart base comprises a rectangular cart frame 108 and a foldable leg 130 extending from a first side, proximate each corner, of rectangular cart frame 108. Each foldable leg 130 is configured to rotate about a first end and to lock into an extended orientation, and to rotate into a folded orientation and become proximate rectangular cart frame 108. For example, a first end of each leg 130 may be hingedly attached to cart base 108, or an upright 138 extending from rectangular cart frame 108. A clasp assembly 118 is proximate a second end of each of the foldable legs 130. A wheel 140 rotatably extends from a second side, proximate each corner, of rectangular cart frame 108. Wheels 140 may comprise a toe kick locking caster.

Collapsible supports 134 may extend from a perimeter of rectangular base 108 and to a let 130. Collapsible supports 134 may be configured and disposed to lock legs 130 into an upright or extended orientation upon legs 130 being rotated into the extended orientation. Collapsible supports 134 may have an outward extension 132 and provide space for storage of items on rectangular frame 108, such as totes or bins.

Removable cart table top 102 comprise a flat surface on a first side 114 and an arm, shown as end portion of retention members 110, proximate each corner of a second side 116 of removable cart table top 102. Each arm, or end portion of retention member 110, is configured and disposed to cooperate with one of the clasp assemblies 118 and removably hold table top 102 to the cart base. Rectangular cart frame 108 may comprises a rectangular perimeter and at least one cross-member 142.

Legs 130 may be joined with an adjacent leg 130 and may be configured to fold with its joined leg 130. For example, joining member 148 may have a pair of legs 130 extending therefrom and joining member 148 may be rotatingly attached to rotation bar 146. In at least one embodiment of the present disclosure, rotation bar 146 extends through uprights 138 and joining member 148 is attached to ends of rotation bar 146. A collet 136 may grip rotation bar 146 and provide a means for rotatingly attaching joining member 148 to rotation bar 146.

Removable cart table top 102 may have a pair of substantially parallel retention members 110, each retention member 110 may longitudinally extend substantially a length of table top 102, proximate an edge, and be gap spaced from the second side of table top 102. Each of the arms may be an end portion of one of the retention members 110.

Each of the clasp assemblies 118 may comprise a lever 120 rotatably attached to each of the legs, each lever 120 is configured to pivot and clasp one of the arms or an end portion of one of the retention members 110. A lever 120 may be rotatably attached to each of the legs 130 and configured to pivot, about pivot point 122, and clasp one of the arms. For example, lever 120 may have a first end portion 127, having recess 128, configured to clasp one of the arms and a second end portion 124 configured to pivot lever 120 by hand and clasp the arm. In at least one embodiment, each leg 130 has a recess 126 configured and disposed to hold an arm, or end portion of retention member 110, upon pivoting lever 120 and clasping the arm.

Removable cart table top 102 may comprise a pair of substantially parallel side rails 112, each side rail 112 longitudinally extends substantially a length of table top 102, proximate an edge, and is substantially perpendicular to retention members 110.

Figure 3:
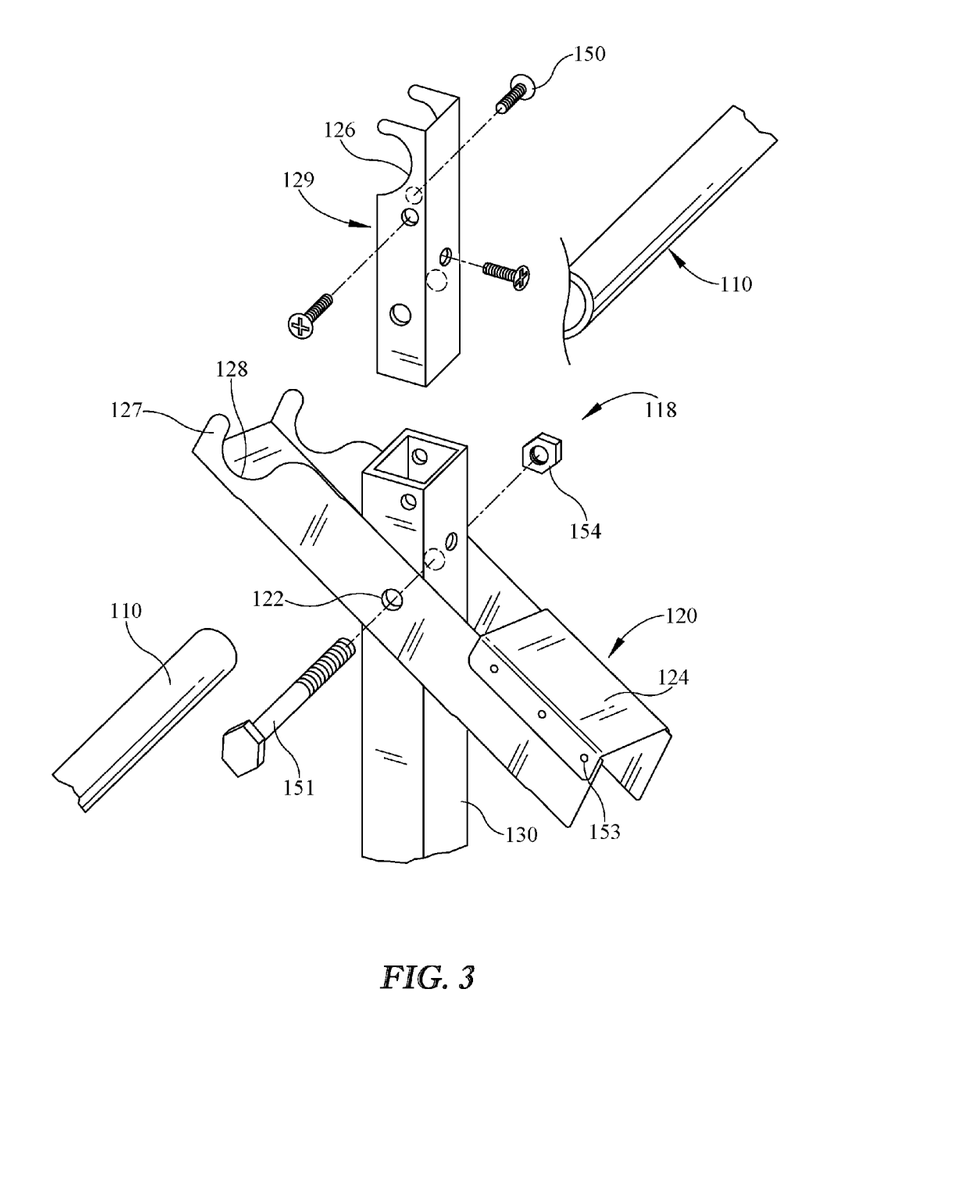
FIG. 3 shows a clasp assembly of the collapsible cart shown in FIG. 1.

FIG. 3 shows clasp assembly 118 of the present disclosure. Clasp assembly 118 may comprise a lever 120 rotatably attached to leg 130. Lever 120 is rotatably secured to leg 130 with fasteners 151 and 154 and is configured to pivot about aperture, or pivot point 122. Lever 120 may have a first end portion 127, having recess 128, configured to clasp one of the arms, or end portion of retention member 110. Lever 120 may have a second end portion 124 configured to pivot lever 120 by hand and clasp arm 110. Second end portion 124 may be configured to become adjacent leg 130 upon clasping. For example, leg 130 may be rectangular and second end portion 124 may have a "U" configuration which may be held with spot welds 153. In at least one embodiment, each leg 130 has a recess 126 configured and disposed to hold an arm, or end portion of retention member 110, upon pivoting lever 120 and clasping an arm, or end portion of retention member 110. Recess 126 may be disposed in a leg insert 129 which may be inserted into leg 130 and fastened thereto with fasteners 150.

Figure 4:
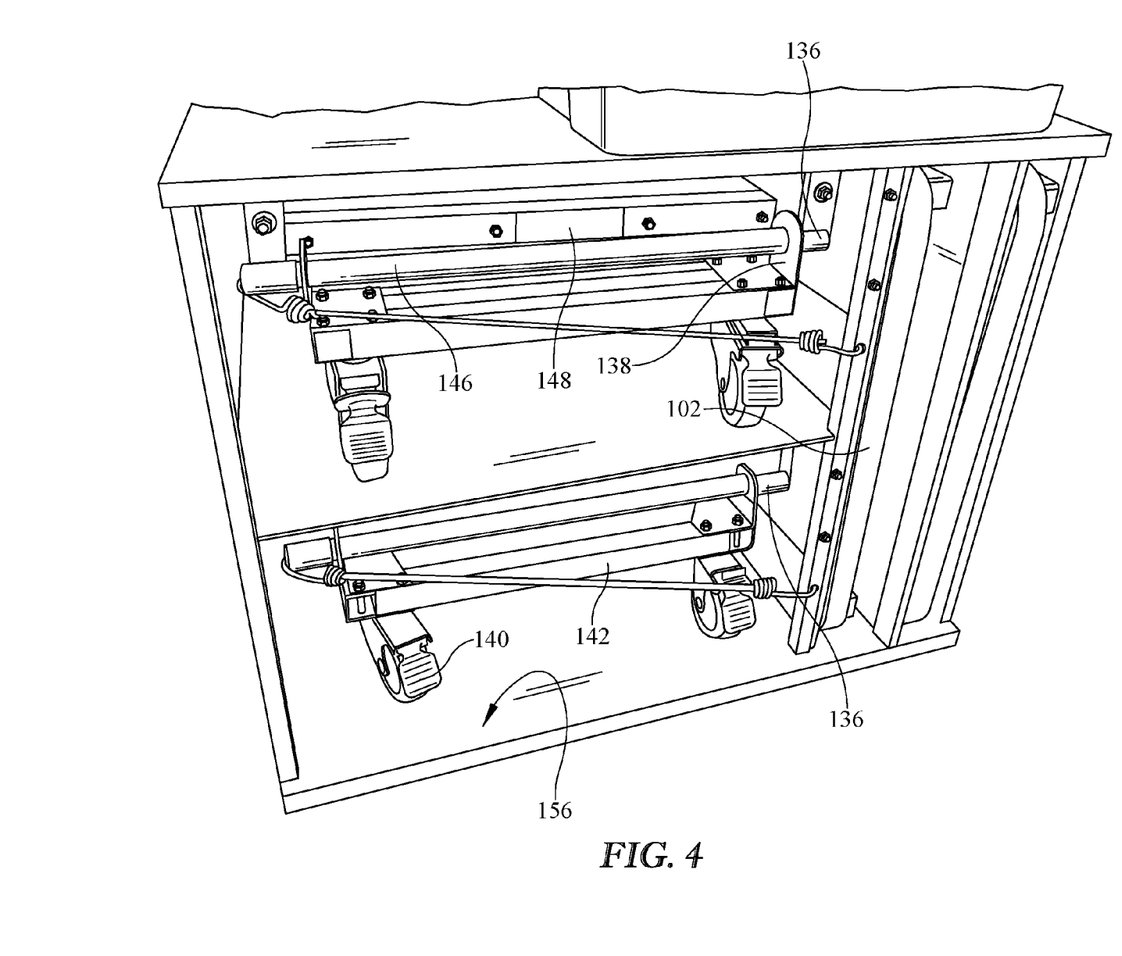
FIG. 4 shows collapsible carts of the present disclosure collapsed and stored in a cart holder.

FIG. 4 shows collapsible carts of the present disclosure collapsed and stored in a cart holder 156. Upon removing table tops 102 from their cart bases and collapsing of the cart bases, the table tops and cart bases may be stored in a cart holder 156 for transport. As seen in the end view of the collapsed cart bases, wheels 140 extend from cross-member 142. Uprights 138 extend up from cross-member 142 and rotatingly hold rotation bar 146. Collets 136 hold rotation bars 146 in place and support joining member 148. Legs 130 extend from joining member 148.

Figure 5:
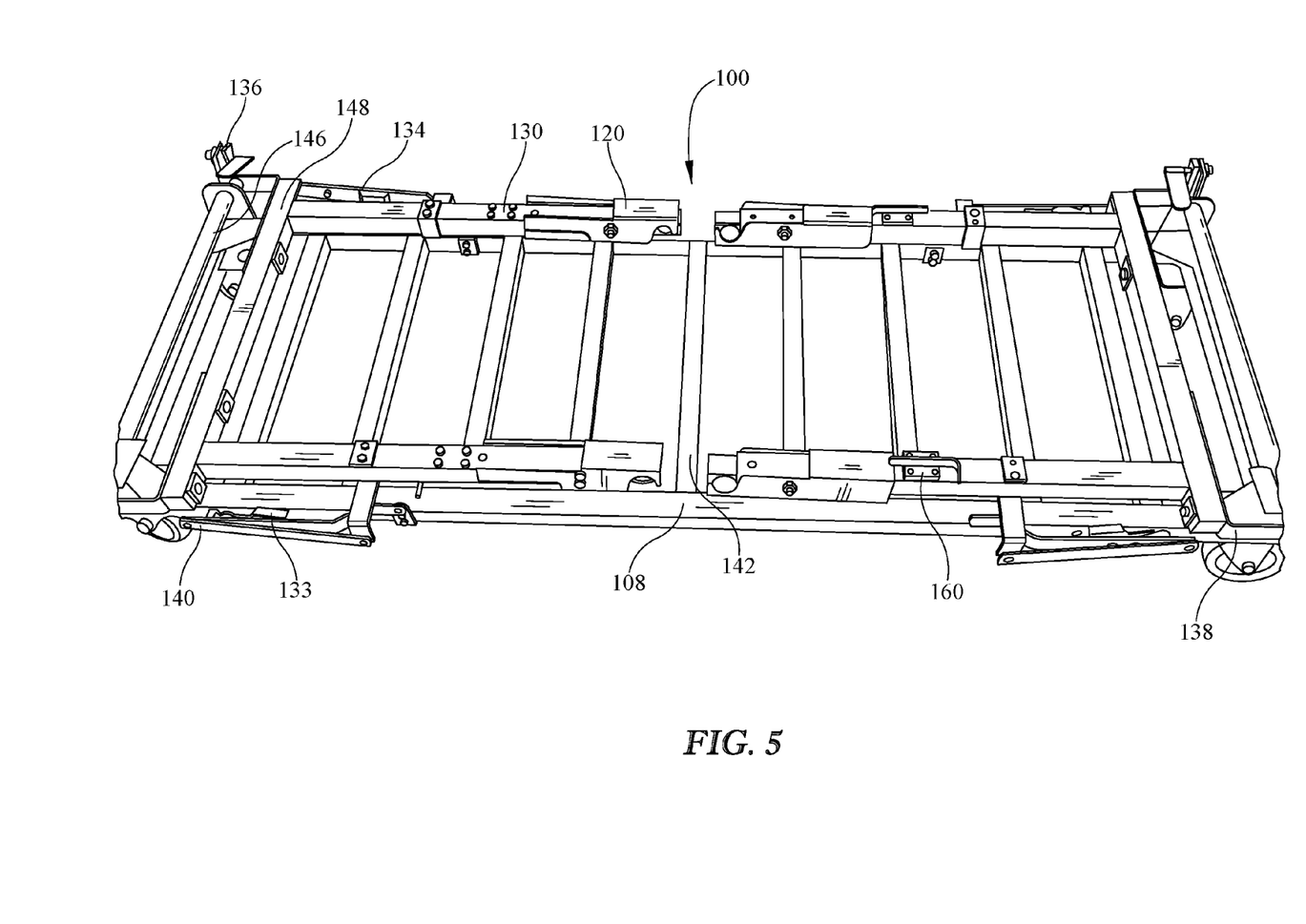
FIG. 5 shows a cart base of the present disclosure disposed for assembly.
Figure 6:
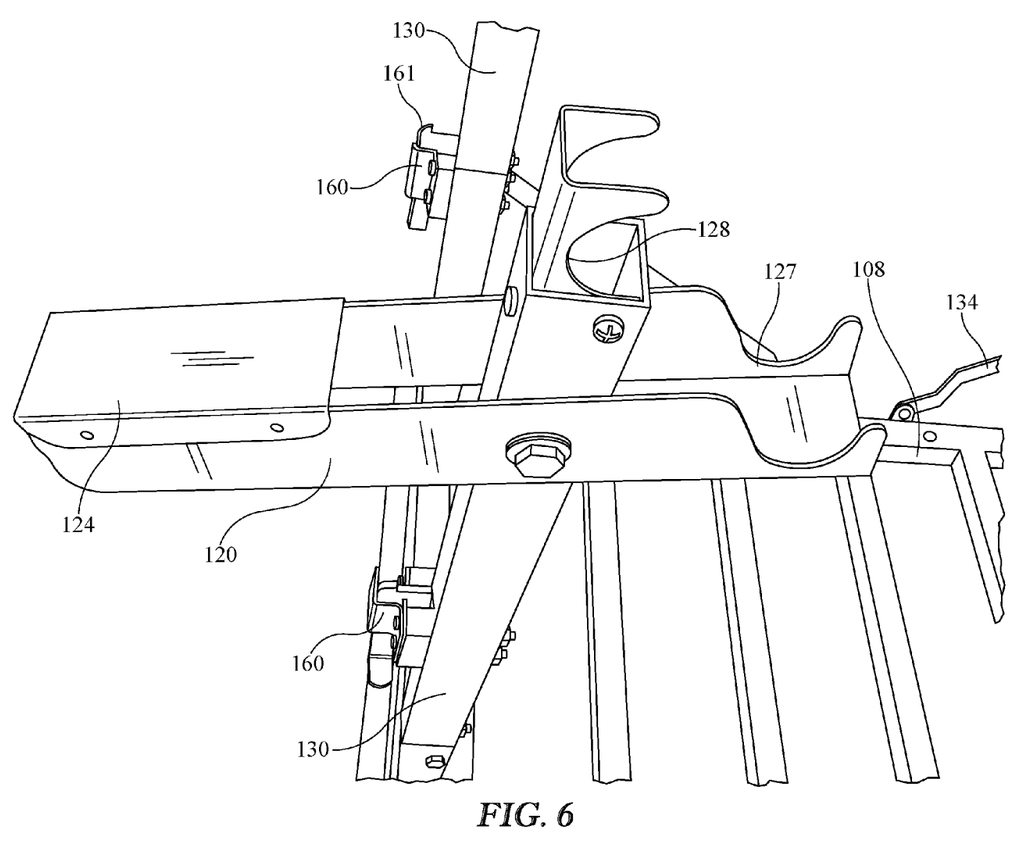
FIG. 6 shows a cart base of the present disclosure having its legs locked into an extended orientation and a clasp assembly.

FIG. 5 shows a cart base of collapsible cart 100 disposed for assembly and FIG. 6 shows collapsible cart 100 having its legs 130 locked into an extended orientation and a clasp assembly. Each leg 130 has a lever lock 160 configured and disposed to lock and hold the second end portion 124 of the lever 120 proximate leg 130. Lever lock 160 has a locking mechanism with a sloped surface 161 biased toward lever 120. Upon rotating lever 120 to pivot and clasp an arm on a table top, second end portion 124 pushes on sloped surface 161 and moves it so that second end portion 124 becomes adjacent leg 130 and sloped surface 161 is then biased to lock lever 120 against leg 130. Also shown in FIG. 5 are optional support locks 133 on collapsible supports 134. Support locks 133 may be desired to secure the extension of collapsible supports 134 and legs 130.

Figure 7:
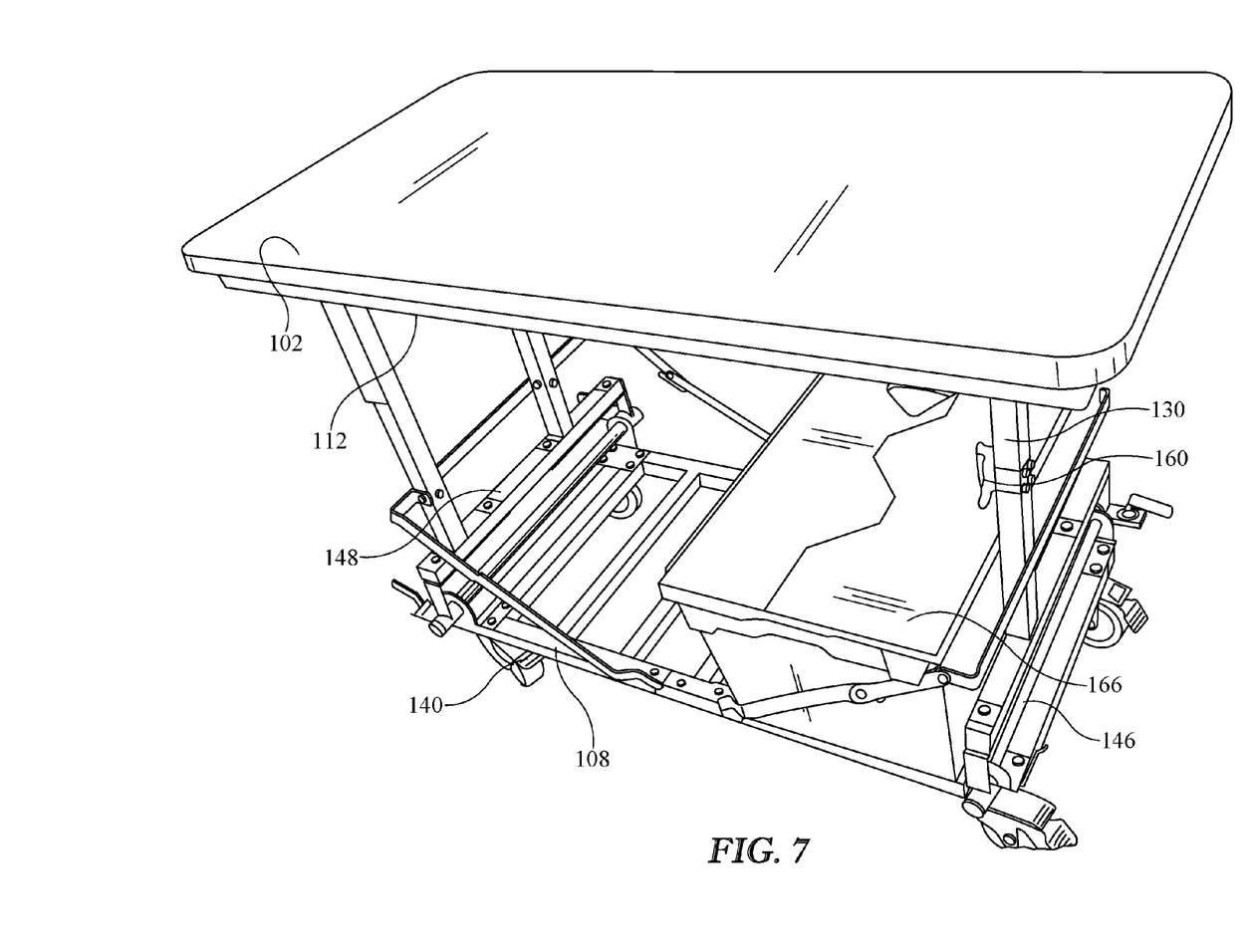
FIG. 7 shows a collapsible cart of the present disclosure having a table top clasped to a cart base.

FIG. 7 shows a collapsible cart of the present disclosure having table top 102 clasped to a cart base. Rectangular cart frame 108 is shown holding storage container 166. Also shown in FIG. 7 is a pair of substantially parallel side rails 112, each longitudinally extending substantially a length of table top 102, proximate its edge. Side rails 112 are substantially perpendicular to retention members 110. Side rails 112 may hold ends of retention members 110 to, and spaced from, table top 102. Side rails 112 may be configured for attaching a curtain thereto, the curtain may be configured to substantially surround the cart base. For example, side rails 112 may have either hooks or loops and the curtain may have the other of hooks or loops.

Also provided in the present disclosure is a method for assembling a collapsible cart. The cart base is placed on a horizontal surface, as shown in FIG. 5. Legs 130 are unfolded about a first end on the cart base, from a folded orientation and into an extended orientation, and the legs are locked into the extended orientation, as shown in FIG. 6. Table top 102 is set onto second ends of the locked legs 130 and clasped onto the second ends of the locked legs, as shown in FIG. 7. As seen in FIGS. 2 and 3, the clasping of the table top onto the second ends of the locked legs may comprise hand rotating a lever about each of the legs, and moving a second end of the lever to become adjacent the leg and thereby sweeping a first end of the lever across the table top and thereby clasping an arm extending from the table top. The clasping of the table top onto the second ends of the locked legs may comprise locking the second end of each of the levers to the leg it is rotated about, for example with lock lever 160. The clasping of the table top onto the second ends of the locked legs and locking the second end of each of the levers to the leg may both be performed upon hand moving the second end of the lever to become adjacent the leg and pushing sloped surface 161. A curtain may be attached to the collapsible cart which may substantially cover the cart base. The rotating of the legs about a first end on the cart base may comprise rotating a pair of joined legs, joined with joining member 148. One or more storage containers may be placed onto the cart base having the legs locked into the extended orientation.

The invention is illustrated by way of example in the drawing Figures and throughout the written description. It should be understood that other additional embodiments of the disclosed method of making an encapsulated reactant having a desired shape or size will become apparent to persons having ordinary skill in the art upon reading the present disclosure.

One feature or aspect of an embodiment is believed at the time of the filing of this patent application to possibly reside broadly in a collapsible cart comprising a cart base and a removable cart table top; the cart base comprising: a rectangular cart frame; a foldable leg extending from a first side, proximate each corner, of the rectangular cart frame, each foldable leg being configured to rotate about a first end and to lock into an extended orientation, and to rotate into a folded orientation and become proximate the rectangular cart frame; a clasp assembly proximate a second end of each of the foldable legs; a wheel rotatably extending from a second side, proximate each corner, of the rectangular cart frame; the removable cart table top comprising: a flat surface on a first side of the removable cart table top; and an arm proximate each corner of a second side of the removable cart table top, each arm being configured and disposed to cooperate with one of the clasp assemblies and removably hold the table top to the cart base.

Another feature or aspect of an embodiment is believed at the time of the filing of this patent application to possibly reside broadly in a collapsible cart wherein the rectangular cart frame comprises a rectangular perimeter and at least one cross-member.

Yet another feature or aspect of an embodiment is believed at the time of the filing of this patent application to possibly reside broadly in a collapsible cart wherein the rectangular cart frame is configured to hold at least one storage container.

Still another feature or aspect of an embodiment is believed at the time of the filing of this patent application to possibly reside broadly in a collapsible cart wherein each of the wheels comprises a toe kick locking caster.

A further feature or aspect of an embodiment is believed at the time of the filing of this patent application to possibly reside broadly in a collapsible cart wherein each of the legs is joined with an adjacent leg and each of the legs is configured to fold with its joined leg.

Another feature or aspect of an embodiment is believed at the time of the filing of this patent application to possibly reside broadly in a collapsible cart wherein the removable cart table top comprises a pair of substantially parallel retention members, each retention member longitudinally extends substantially a length of the table top, proximate an edge, and is gap spaced from the second side of the table top, each of the arms is an end portion of one of the retention members.

Yet another feature or aspect of an embodiment is believed at the time of the filing of this patent application to possibly reside broadly in a collapsible cart wherein each of the clasp assemblies comprises a lever rotatably attached to each of the legs, each of the levers being configured to pivot and clasp one of the arms.

Still another feature or aspect of an embodiment is believed at the time of the filing of this patent application to possibly reside broadly in a collapsible cart wherein each of the levers has a first end portion configured to clasp one of the arms and a second end portion configured to pivot the lever by hand and clasp the arm.

A further feature or aspect of an embodiment is believed at the time of the filing of this patent application to possibly reside broadly in a collapsible cart wherein each leg has a lever lock configured and disposed to lock and hold the second end portion of the lever proximate the leg.

Another feature or aspect of an embodiment is believed at the time of the filing of this patent application to possibly reside broadly in a collapsible cart wherein the removable cart table top comprises a pair of substantially parallel side rails, each side rail longitudinally extends substantially a length of the table top, proximate an edge, and is substantially perpendicular to the retention members.

Yet another feature or aspect of an embodiment is believed at the time of the filing of this patent application to possibly reside broadly in a collapsible cart wherein the side rails are attached to the table top and hold ends of the retention members.

One feature or aspect of an embodiment is believed at the time of the filing of this patent application to possibly reside broadly a collapsible cart comprising a curtain substantially surrounding the cart base.

Another feature or aspect of an embodiment is believed at the time of the filing of this patent application to possibly reside broadly in a collapsible cart wherein each of the side rails is configured for attaching a curtain thereto, the curtain being configured to substantially surround the cart base.

Yet another feature or aspect of an embodiment is believed at the time of the filing of this patent application to possibly reside broadly in a method for assembling a collapsible cart comprising the steps of: placing a cart base on a horizontal surface; unfolding legs about a first end on the cart base, from a folded orientation and into an extended orientation; locking the legs into the extended orientation; setting a table top onto second ends of the locked legs; and clasping the table top onto the second ends of the locked legs.

Still another feature or aspect of an embodiment is believed at the time of the filing of this patent application to possibly reside broadly in a method for assembling a collapsible cart wherein the step of clasping the table top onto the second ends of the locked legs comprises hand rotating a lever about each of the legs, and moving a second end of the lever to become adjacent the leg and thereby sweeping a first end of the lever across the table top and thereby clasping an arm extending from the table top.

A further feature or aspect of an embodiment is believed at the time of the filing of this patent application to possibly reside broadly in a method for assembling a collapsible cart wherein the step of clasping the table top onto the second ends of the locked legs further comprises locking the second end of each of the levers to the leg it is rotated about.

Another feature or aspect of an embodiment is believed at the time of the filing of this patent application to possibly reside broadly in a method for assembling a collapsible cart wherein the steps of clasping the table top onto the second ends of the locked legs and locking the second end of each of the levers to the leg are both performed upon hand moving the second end of the lever to become adjacent the leg.

Yet another feature or aspect of an embodiment is believed at the time of the filing of this patent application to possibly reside broadly in a method for assembling a collapsible cart comprising attaching a curtain to the collapsible cart and substantially covering the cart base.

Still another feature or aspect of an embodiment is believed at the time of the filing of this patent application to possibly reside broadly in a method for assembling a collapsible cart wherein the step of rotating legs about a first end on the cart base comprises rotating a pair of joined legs.

A further feature or aspect of an embodiment is believed at the time of the filing of this patent application to possibly reside broadly in a method for assembling a collapsible cart comprising placing a storage container onto the cart base having the legs locked into the extended orientation.

The present invention is in the technical field of collapsible carts. More particularly, the present invention is in the technical field of portable wheeled service or presentation carts. An embodiment of the present invention is a collapsible wheeled cart that may allow users a presentation and serving table in catering situations, and the present invention may provide a means of transport of goods to the catered area. The present invention is collapsible and may be lightweight; so that, the cart may accompany catered goods in a truck or van to the catered event.

The FIGs. show the collapsible cart with and without a drape attached. In at least on embodiment, the cart may have dimensions of about 65 inches in length, about 24 inches in width, and about 36 inches in height and may have an overall weight of approx. 60 lbs. The cart table top length can be designed to varied lengths from about 48 inches to about 78 inches. It is to be understood that the cart and table top of the present disclosure may be smaller, larger, lighter, or heavier, depending upon a desired configuration or use. The cart table top surface may be a hard surface laminate with the vertical margins of the table top also laminated with edge banding. The drape may substantially surround an outer perimeter of the cart and may drape down the sides of the cart. The drape may be a washable fabric, such as polyester, for example. The drape may attached to the cart by means of a hook and loop fastener. The loop, one-half of the hook and loop fastener, may be sewn to the top edge of the drape fabric; while as, the hook may be the other one-half of the hook and loop fastener and may be substantially permanently attached to the cart table top.

There is shown an embodiment of the cart of the present disclosure without the drape attached. The cart is shown in two sections: the table top section and the cart base section. The cart base section may have a cart frame with uprights or legs. Portability of the cart, when not in use, may be enhanced when the cart is disassembled into two sections (a cart base section and a table top section, for example), and, removal of the attached drape. The uprights or legs on the cart base, configured for supporting the table top, are collapsible by folding downward onto the cart frame; thereby, facilitating compactness and portability. The weight of the table top may be approximately 25 lbs. The cart base weight may be approximately 35 lbs. It is to be understood that weights of the table top and base may vary as may be desired.

The cart table top with the support/attachment frame is shown. The table top and its frame may be lightweight, for example it may weigh approximately 25 lbs. A light weight may be achieved by means of a hollow core table and aluminum frame components. The hollow core table may be about 1¼ "thick and has corners with finished about 2" radiuses. The table may be covered with 0.050 inch hard surface laminate and the vertical margins may be edge banded with the same laminate. The base or support/attachment frame may give rigid support for the table top and may provide for attachment of the table top to the cart base. The support/attachment frame may consist of side rail aluminum square tube and aluminum round tube components in a welded construction. It is to be understood that in at least one embodiment of the present disclosure, the base section may be assembled with fasteners. Side rails may be about 1¼ inch OD by 1/16 inch thickness aluminum square tube that may be hole sawed to accommodate round cross pieces. Completion of the frame may be with cross pieces, which may comprise 1 inch diameter OD by ⅛ inch thickness aluminum round tube in a welded or fastened construction. The support/attachment frame may be attached to the table by means of 3/16 inch toggle bolts (not shown), or other means or sized toggle bolts. A hook and loop fastener (hook side) having adhesive backing may be attached to the outside of the side rails in a continuous length for contact with loop fastener of aforementioned drape.

Referring now to the invention in more detail, the case base may have several functions. For example, the cart base (a) may provide upright support for the table top, and (b) have wheels and may therefore be mobile allowing for the transport of goods to and from a catered area and receiving area such as a dock, and (c) is itself portable having uprights that fold downward onto the cart frame making the cart base compact for carriage in a truck or van or for storage in general. Securing of the table top frame to the cart base may occur by a clasp assembly. In operation, uprights may be stabilized and held substantially rigid by two means: (a) a collet or quarter turn locking collet and, (b) folding struts. The quarter turn locking collets may provide resistance or cessation of the rotation characteristics of the cart base uprights, reduce jarring during rolling, and improve rigidity. The folding struts may provide additional strength and/or rigidity to the legs or uprights. The wheels may be 4" medium duty total lock casters, for example. The casters may be equipped with toe kick lock levers and/or may be non-marking.

The construction of the cart base may be relegated to eight subassemblies: cart frame, rotation bar riser, stationery rotation bar, upright/cross member unit, strut, caster, clasp, and collet or quarter turn locking collet. The cart frame subassembly may be a rectangular frame of made from aluminum sq. tube 1¼ inch by 1/16 inch thickness welded construction. Nine rungs of 1 inch×1/16 inch thickness aluminum sq. tube may be inserted into the rectangular frame by welding or fastening. It is to be understood that different and other materials and sizes may be use in embodiments of the cart of the present disclosure.

The rotation bar riser may comprise ⅛ inch flat aluminum sheet and may be hole sawed to accommodate the stationery rotation bar. It may be welded, or otherwise fastened to the cart frame. The stationary rotation bar may be 1 inch×⅛ inch thickness aluminum round tube welded to the rotation bar risers. The uprights may be 1¼ inch×1/16 inch aluminum sq. tube welded, or otherwise fastened, to a cross member which may be made of 1¼ inch×⅛ inch aluminum sq. tube.

The strut subassembly may be a folding mechanism and may be made of 1 inch×⅛ inch flat stainless steel fastened together with ¼" semi-hollow tubular rivets. The wheels may be 4 inch medium duty total locking casters. The casters may have a toe kick locking lever and may be non-marking. The casters may be bolted, or otherwise fastened, to the cart frame with ¼ inch bolts (not shown), for example. Securement of the table top to the cart base may occur when the stationery clasp part is mated to the bar of the table top frame in a selected location.

Assembly of the table top to the cart base is described. The table top is placed on the unfolded cart base uprights or legs. The table top frame attachment bar is moved and positioned so that the bar mates into the recess of the stationery clasp part located proximate the extremity of the cart base upright. The table top is now in a stable condition resting on the cart base uprights. The rotating clasp part is then rotated and closed over the table top frame attachment bar thus providing a positive attachment of table top frame to the cart base upright. A locking clip (not shown) retains the rotating clasp part in a closed and locked position.

Four clasps are closed and locked independently onto the table top attachment bar at their respective positions. The four clasps working together, when fastened onto the bars of the table top frame, form a strong attachment system of the table top to the cart base. The stationery clasp part may be made of cut and formed 18 ga. stainless steel sheet metal. The stationery clasp part may be precisely formed to fit the inner dimension of the cart base square tube upright and may be held place with three #8 stainless steel bolts. The rotating clasp part may be made of cut and formed 18 ga. stainless steel sheet metal. The rotating clasp part handle may be made of cut and formed 18 ga. stainless steel sheet metal. The rotating clasp part handle may be spot welded to the rotating clasp part. A $5/16$ inch bolt may protrude through the rotating clasp part, the square tube upright, and stationery clasp part. The bolt may be fastened with a nut. The bolt, or other fastener, is configured to hold the clasp in place, and serve as an axial rotation point for the rotating clasp part.

A locking collet may be connected to the upright/cross member unit by a flat $1\frac{1}{4}$ inch$\times\frac{1}{8}$ inch stainless steel joiner bar that may be welded to the collet body and connected to the stationery rotation bar by insertion of the bar into the collet body. The collet body may have a cylinder bore dimension of 1 inch inside diameter and/or an outside diameter of $1\frac{1}{4}$ inch. The collet body cylinder may have a $3/16$ inch gap along the axial plane of the cylinder and a cylinder length of $1\frac{3}{4}$ inch. Attached to the collet body at the cylinder gap may be two flanges of $\frac{1}{8}$ inch stainless steel. Compression of the stationery rotation bar from the collet body occurs when there is interaction of the cam lobes, if using a quarter turn locking collet, situated on the collet body flanges and locking stem plate. The locking assembly can thus be locked firmly onto the stationery rotation bar. The locking stem may be a $5/16$ inch stainless steel rod with threads. The locking stem may have a nut and washer.

The collapsible cart of the present disclosure may provide some advantages over known carts. The presently disclosed collapsible cart may provide a presentation and serving table for a food catered event, or in many situations where product is displayed to the consumer. Presentation may be at a counter height of 36 inches, whereas, a commonly used practice is to use a banquet table having a seating height of 28 inches to 29 inches, and to dress the table with a tablecloth and drape. The proper height and laminate surface may be more attractive to the consumer than a table cloth. At least one embodiment of the present invention provides for convenient attachment of the drape, having one-half of the hook and loop fastener permanently attached to the table top. In at least one embodiment of the present invention, the cart may be used for the transport of food, appliances, or goods from a staged area such as a dock or street access to the catered area. The catering cart may have a load capacity of 150 lbs. and have two-tiered functionality. Commonly used carts for transport of goods from a staged area such as a dock are generally of two types: a heavy duty flatbed cart, or a plastic cart with tray like construction made of heavy duty plastic. Neither type of cart may be suitable for presentation, and are typically removed from sight from the event area. Many of these may not routinely be rolled onto delicate flooring that might be found in meeting rooms, offices, museums, etc.

Further, in at least one embodiment of the present invention, the cart is lightweight and portable. The cart of the present disclosure may provide for convenient disassembly of into two sections, which may make the cart manageable both in weight and maneuverability. This may allow for carriage in a vehicle; so that, the cart may accompany catered goods to the event. The folding mechanism of the uprights onto cart base may make the cart base compact for both carriage and storage.

In at least one embodiment of the presently disclosed cart, the cart may serve as a presentation or serving table that is wheeled and has load carrying capability. It may be lightweight and when it is not in use, due to the folding mechanism, may become compact and suitable for carriage or storage.

In at least one embodiment of the present disclosure, a cart comprises a removable top and a base. The base may have foldable legs that may be positioned to extend upward from, or lay upon, a cart frame. The removable top may be securely and removable attached to the upwardly extended legs with a clasp. For example, a first end of each of four legs may be hingedly attached to the frame and a second end of each leg may have a clasp. Each clasp may comprise a receiving portion and a pivoting portion, wherein the pivoting portion may be pivoted, secured to the leg, and hold a portion of the top. The first end of each leg may be held in the upwardly extended orientation with a locking mechanism, such as a locking collet.

While the foregoing written description of the invention enables one of ordinary skill to make and use what is considered presently to be preferred embodiments thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A collapsible cart comprising a cart base and a removable cart table top;
   the cart base comprising:
   a rectangular cart frame;
   a foldable leg extending from a first side, proximate each corner, of the rectangular cart frame, each foldable leg being configured to rotate about a first end and to lock into an extended orientation, and to rotate into a folded orientation and become proximate the rectangular cart frame;
   a clasp assembly proximate a second end of each of the foldable legs;
   a wheel rotatably extending from a second side, proximate each corner, of the rectangular cart frame;
   the removable cart table top comprising:
   a flat surface on a first side of the removable cart table top; and
   a pair of substantially parallel retention members, each retention member longitudinally extends substantially a length of the table top, proximate an edge, each of the retention members having end portions proximate each corner of a second side of the removable cart table top, each retention member being spaced from the second side of table top and having the end portions configured and disposed to cooperate with one of the clasp assemblies and removably hold the table top to the cart base.

2. The collapsible cart of claim 1, wherein the rectangular cart frame comprises a rectangular perimeter and at least one cross-member.

3. The collapsible cart of claim 2, wherein the rectangular cart frame is configured to hold at least one storage container.

4. The collapsible cart of claim 1, wherein each of the wheels comprises a toe kick locking caster.

5. The collapsible cart of claim 1, wherein each of the legs is joined with an adjacent leg and each of the legs is configured to fold with its joined leg.

6. The collapsible cart of claim 1, wherein each of the clasp assemblies comprises a lever rotatably attached to each of the legs, each of the levers being configured to pivot and clasp one of the end portions of one of the retention members.

7. The collapsible cart of claim 6, wherein each of the levers has a first end portion configured to clasp one of the end portions of one of the retention members and a second end portion configured to pivot with the lever by hand and clasp the end portion of the retention member.

8. The collapsible cart of claim 7, wherein each leg has a lever lock configured and disposed to lock and hold the second end portion of the lever proximate the leg.

9. The collapsible cart of claim 1, wherein the removable cart table top comprises a pair of substantially parallel side rails, each side rail longitudinally extends substantially a length of the table top, proximate an edge, and is substantially perpendicular to the retention members.

10. The collapsible cart of claim 9, wherein the side rails are attached to the table top and hold ends of the retention members.

11. The collapsible cart of claim 1 further comprising a curtain substantially surrounding the cart base.

12. The collapsible cart of claim 9, wherein each of the side rails is configured for attaching a curtain thereto, the curtain being configured to substantially surround the cart base.

* * * * *